UNITED STATES PATENT OFFICE.

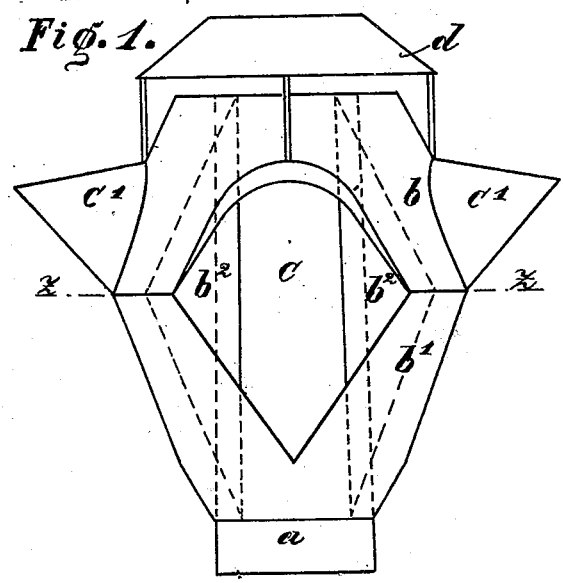
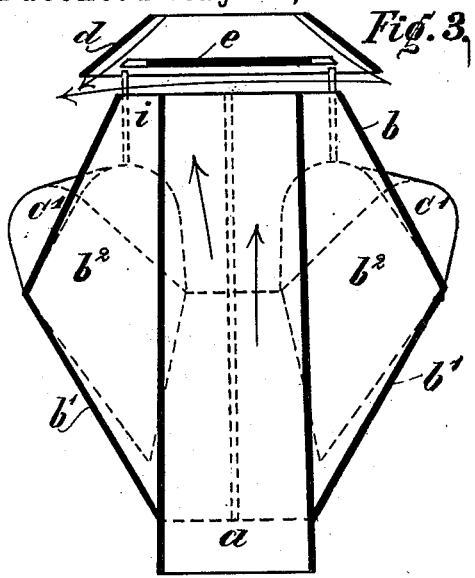
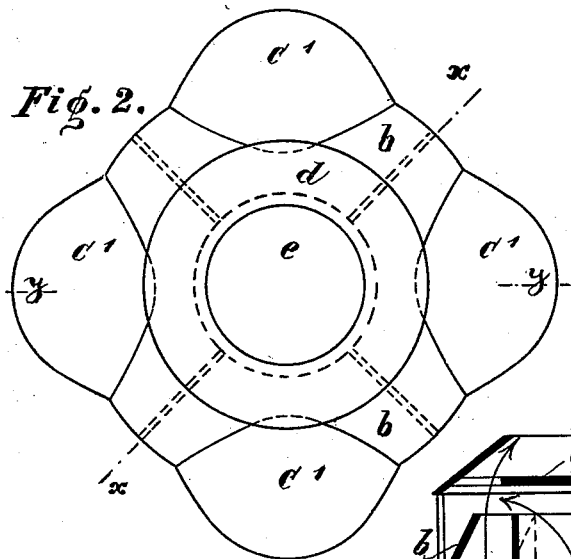
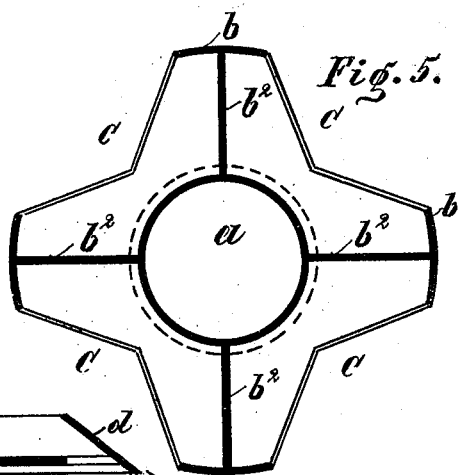
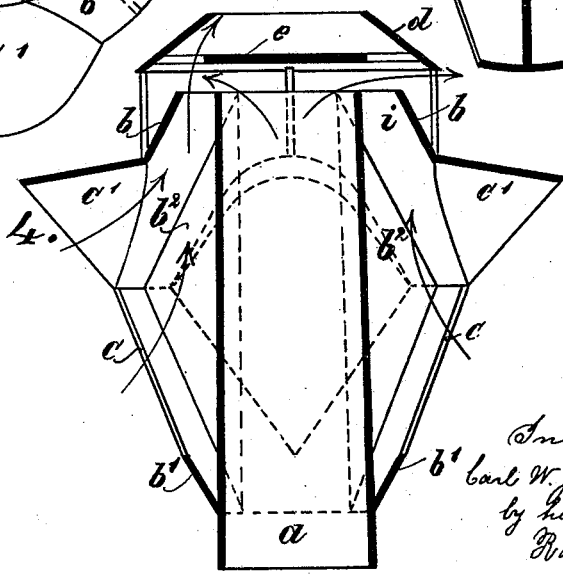

CARL WILHELM JOHANN MARTENS, OF HAMBURG, GERMANY.

COWL.

SPECIFICATION forming part of Letters Patent No. 520,368, dated May 22, 1894.

Application filed February 7, 1894. Serial No. 499,385. (No model.)

*To all whom it may concern:*

Be it known that I, CARL WILHELM JOHANN MARTENS, of Hamburg, Germany, have invented new and useful Improvements in Cowls, of which the following is a specification.

This invention relates to an improved construction of cowl adapted for use as a cover or top for a chimney, funnel, ventilator or other air outlet pipe.

The object of the invention is to so construct a cowl, that the action of wind upon it is rendered useful under all circumstances for the abstraction of smoke, air, or the like from the pipe or passage to which the cowl is applied, it being immaterial at what angle or from what direction the wind strikes the head of the cowl, and further that the wind will be conducted through the head in such a manner that its energy is used in a very effective manner. For this purpose the cowl is constructed in such a way that the wind entering the openings in the same is not allowed to glance off again but is caused to pass through the head of the cowl.

In the accompanying drawings Figure 1 is an elevation of a cowl constructed according to this invention and Fig. 2 is a plan thereof. Figs. 3 and 4 are vertical sections on the lines $x\ x$ and $y\ y$ respectively of Fig. 2; and Fig. 5 is a horizontal section on the line $z\ z$ of Fig. 1.

$a$ is the outlet-pipe around the upper end of which is arranged a double cone $b\ b'$ which is joined at the bottom to the pipe $a$, and at the top leaves a gap $i$ between itself and the mouth of the pipe. Four partitions $b^2$ divide the space between $b\ b'$ and $a$ into four equal compartments; and for each of these compartments there is an opening $c$ in the cone $b\ b'$ the opening being covered by a cap $c'$. The wind that enters these compartments through the openings $c$ is directed upward by the caps $c'$ and is prevented by the wall of the double cone from escaping downward or sidewise. The wind thus directed escapes upward through the gap $i$ and thereby draws or induces air to flow out of the pipe $a$.

Over the mouth of the outlet pipe $a$ there is a plate $e$ and at a fixed distance from this plate and over the same there is an annular conical cap $d$. These parts serve to prevent rain from entering the pipe $a$; they also serve to lead away through the head, gusts of wind that enter either from above or sidewise in the direction of the arrows (Fig. 3) in such a manner that these gusts always have a sucking or inducing action on the air in the pipe $a$.

I claim—

The improved cowl comprising the outlet pipe $a$, the double cone $b\ b'$ which at its lower end fits tightly around the said pipe and at its upper end leaves a gap $i$ between itself and the said pipe, and which is formed with openings $c$, having caps $c'$, a cover-plate $e$ arranged above the mouth of the said outlet-pipe, and a conical cap $d$ arranged to cover the opening between the upper portion of the said double-cone and the cover-plate substantially as described and shown, for the purpose specified.

In testimony whereof I have signed my name to this specification in the presence of two subscribing witnesses.

CARL WILHELM JOHANN MARTENS.

Witnesses:
 MAX FOUQUET,
 HEINRICH EGGERS.